United States Patent
Yang

(10) Patent No.: US 10,327,210 B2
(45) Date of Patent: Jun. 18, 2019

(54) LOW POWER CONSUMPTION COMMUNICATION METHOD AND APPARATUS

(71) Applicant: HUAWEI TECHNOLOGIES CO., LTD., Shenzhen (CN)

(72) Inventor: Hui Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/953,491

(22) Filed: Apr. 15, 2018

(65) Prior Publication Data

US 2018/0242257 A1    Aug. 23, 2018

Related U.S. Application Data

(63) Continuation of application No. PCT/CN2016/101923, filed on Oct. 12, 2016.

(30) Foreign Application Priority Data

Oct. 16, 2015   (CN) .......................... 2015 1 0672451

(51) Int. Cl.
   *H04W 52/02*    (2009.01)
   *H04W 72/04*    (2009.01)
   *H04W 52/42*    (2009.01)

(52) U.S. Cl.
   CPC ... *H04W 52/0261* (2013.01); *H04W 52/0216* (2013.01); *H04W 52/42* (2013.01);
   (Continued)

(58) Field of Classification Search
   CPC ............. H04W 52/42; H04W 52/0216; H04W 52/0261; H04W 72/0446; H04W 72/0493;
   (Continued)

(56) References Cited

U.S. PATENT DOCUMENTS

2007/0083780 A1    4/2007   Aoyagi et al.
2007/0248031 A1    10/2007  Kitahara et al.
(Continued)

FOREIGN PATENT DOCUMENTS

CN    101609359 A    12/2009
CN    101977427 A    2/2011
(Continued)

OTHER PUBLICATIONS

Recovery effect, From Wikipedia, the free encyclopedia, website: https://en.wikipedia.org/wiki/Recovery_effect, download Apr. 17, 2018, 2 pages.
(Continued)

*Primary Examiner* — Brian D Nguyen
(74) *Attorney, Agent, or Firm* — Kilpatrick Townsend & Stockton LLP

(57) ABSTRACT

The present invention discloses a low power consumption communication method. The method includes: obtaining, by a first network device, a data interval policy, where the data interval policy is determined according to a task status of the first network device, and the data interval policy includes a data segment length and a time interval between data segments; sending, by the first network device, the data interval policy to a second network device; and sending, by the first network device, data to the second network device according to the data interval policy or receiving data that is sent by the second network device according to the data interval policy. an electric quantity can be recovered in a time interval between data segments by using a battery recovery effect, thereby reducing electricity consumption during communication, and prolonging a usage time of a battery of a network device.

23 Claims, 11 Drawing Sheets

(52) U.S. Cl.
CPC ... *H04W 72/0446* (2013.01); *H04W 72/0493* (2013.01); *Y02D 70/00* (2018.01); *Y02D 70/126* (2018.01); *Y02D 70/1262* (2018.01)

(58) Field of Classification Search
CPC ... Y02D 70/126; Y02D 70/00; Y02D 70/1262
See application file for complete search history.

(56) References Cited

U.S. PATENT DOCUMENTS

| | | | |
|---|---|---|---|
| 2007/0291673 A1 | 12/2007 | Demirhan et al. | |
| 2010/0072974 A1* | 3/2010 | Uchida | G04C 10/02 323/318 |
| 2010/0158076 A1* | 6/2010 | Snlyely | H04B 1/7075 375/130 |
| 2011/0055836 A1* | 3/2011 | Raghavan | G06F 8/4432 718/101 |
| 2011/0313697 A1* | 12/2011 | Staton | G01R 31/392 702/63 |
| 2011/0320830 A1* | 12/2011 | Ito | G06F 1/24 713/300 |
| 2012/0021807 A1* | 1/2012 | Book | H02J 7/0003 455/572 |
| 2012/0328094 A1* | 12/2012 | Pattenden | G06F 1/26 380/28 |
| 2013/0076324 A1* | 3/2013 | Fujii | B60R 16/03 323/276 |
| 2014/0198663 A1 | 7/2014 | Xu et al. | |
| 2015/0373723 A1 | 12/2015 | Zhang et al. | |

FOREIGN PATENT DOCUMENTS

| | | |
|---|---|---|
| CN | 104035543 A | 9/2014 |
| EP | 2988219 A1 | 2/2016 |

OTHER PUBLICATIONS

Chau, C. K.; Qin, F.; Sayed, S.; Wahab, M.; Yang, Y. (2010). "Harnessing battery recovery effect in wireless sensor networks: Experiments and analysis".IEEE Journal on Selected Areas in Communications, vol. 28, No. 7, Sep. 2010, 11 pages.

Daler Rakhmatov et al., A Model for Battery Lifetime Analysis for Organizing Applications on a Pocket Computer. IEEE Transactions on Very Large Scale Integration (VLSI) Systems, vol. 11. No. 6, Dec. 2003, 12 pages.

* cited by examiner

1

LOW POWER CONSUMPTION COMMUNICATION METHOD AND APPARATUS

CROSS-REFERENCE TO RELATED APPLICATIONS

This application is a continuation of International Application No. PCT/CN2016/101923, filed on Oct. 12, 2016, which claims priority to Chinese Patent Application No. 201510672451.4, filed on Oct. 16, 2015, The disclosures of the aforementioned applications are hereby incorporated by reference in their entireties.

TECHNICAL FIELD

The present invention relates to the field of communications technologies, and in particular, to a method for implementing low power consumption communication.

BACKGROUND

In communications network devices, most terminal devices are powered by batteries, for example, lithium batteries or nickel batteries. Because either battery replacement or battery charging inevitably affects use of a terminal device, a key technical problem of the network device is how to make better use of an electric quantity of a battery of a network terminal device and prolong a usage time of the battery. Research has found that the lithium battery and the nickel battery have characteristics such as a non-linear discharge effect and a recovery effect. The non-linear discharge characteristic means that an electric quantity of a battery does not linearly decrease as use of a current, but exponentially decreases according to factors such as a current change, a service model, and a usage time. If discharge duration of the battery increases, more severe non-linear discharge occurs, and the electric quantity of the battery decreases at a higher speed. The recovery effect characteristic means that a part of an electric quantity of a battery is recovered if the battery is not used for a period of time after discharging. The non-linear discharge effect and the battery recovery effect differ for different types of batteries and different electric quantity statuses of batteries.

In the prior art, network data transmission is usually continuous. Using a Long Term Evolution (LTE) network as an example, after a synchronous channel is set up, a terminal continuously sends or receives data on uplink and downlink data channels. Therefore, a battery is kept in a discharge state during the network data transmission. Consequently, an electric quantity is consumed at a higher speed due to the non-linear discharge characteristic, and the battery recovery effect cannot take effect, thereby reducing an endurance time of the electric quantity of the battery.

SUMMARY

Embodiments of the present invention provide a method for implementing low power consumption communication and an apparatus, to reduce impact of non-linear discharge on an electric quantity of a battery, thereby enhancing a battery recovery effect, and ensuring communication efficiency and stability of a network on which a device is located.

To resolve the foregoing problems, the embodiments of the present invention provide the following solutions:

According to a first aspect, an embodiment of the present invention provides a low power consumption communication method. The method includes:

obtaining, by a first network device, a data interval policy, where the data interval policy is determined according to a task status of the first network device, so that the first network device can communicate, in the task status, with a second network device according to the data interval policy; and the data interval policy includes a data segment length and a time interval between data segments, where the time interval between data segments is used for recovering an electric quantity of a battery of the second network device; sending, by the first network device, the data interval policy to the second network device; and sending, by the first network device, data to the second network device according to the data interval policy or receiving data that is sent by the second network device according to the data interval policy. Because the network devices at two ends communicating with each other both perform data transmission according to the data interval policy, data is sent at an interval. That is, the data is divided into multiple data segments, and a time interval is inserted between every two data segments. According to an aspect, because only one data segment is sent each time, a sending time for sending the data segment is shorter than a sending time for sending all the data, avoiding an increase in a battery consumption speed caused due to a non-linear discharge effect of a battery when the battery is discharged for a long time. According to another aspect, because a time interval is inserted between every two data segments, a part of an electric quantity of the battery may be recovered in the time interval due to a battery recovery effect. In this way, electricity consumption of a network device caused by communication is reduced, and a usage time of a battery of the network device is prolonged. In addition, because the data interval policy for saving the electric quantity of the battery of the second network device is formulated by the first network device, adaptability of the communication method is enhanced. The first network device formulates the data interval policy according to a current task status of the first network device. Therefore, scheduling can be properly performed for each task of the first network device when low power consumption communication of the second network device is implemented, thereby improving usage effectiveness of a network resource of the first network device, and reducing the impact of the low power consumption communication on entire network communication.

In a first possible implementation of the first aspect, the obtaining, by a first network device, a data interval policy includes: receiving, by the first network device, battery recovery information of the battery of the second network device that is sent by the second network device; and determining, by the first network device, the data interval policy according to the task status and the battery recovery information.

With reference to the first possible implementation of the first aspect, in a second possible implementation, the determining, by the first network device, the data interval policy according to the task status and the battery recovery information includes: determining, by the first network device, a value range of the data segment length and a value range of the time interval between data segments according to the task status; and determining, in the value range of the data segment length and the value range of the time interval between data segments, a value of the data segment length and a value of the time interval between data segments according to the battery recovery information.

With reference to the second possible implementation of the first aspect, in a third possible implementation, the battery recovery information includes information about a current status of the battery of the second network device and type information of the battery.

With reference to the third possible implementation of the first aspect, in a fourth possible implementation, the determining, in the value range of the data segment length and the value range of the time interval between data segments, a value of the data segment length and a value of the time interval between data segments according to the battery recovery information includes: querying a preset corresponding battery type-based recovery effect model according to information about a battery status and information indicating a battery type, to obtain a correspondence that is between a recovery effect and a recovery time and that is of the battery type in the battery status; and selecting, from the value range of the data segment length and the time interval between data segments, a data segment length and a time interval between data segments that are most favorable for battery recovery of the second network device. Because the first network device further considers the battery recovery information during the formulation of the data interval policy, a battery recovery effect of the second network device exerted by the data interval policy is enhanced while executability of the data interval policy in a network is ensured.

With reference to any one of the first aspect or the first to the fourth possible implementations, in a fifth possible implementation, before the determining, by the first network device, the data interval policy according to the task status and the battery recovery information, the method further includes: determining, by the first network device according to the task status, whether to perform low power consumption communication; and the determining, by the first network device, the data interval policy according to the task status and the battery recovery information includes: if determining to perform low power consumption communication, determining, by the first network device, the data interval policy according to the task status and the battery recovery information.

With reference to the fifth possible implementation of the first aspect, in a sixth possible implementation, the determining, by the first network device according to the task status, whether to perform low power consumption communication includes: determining, by the first network device, an available value range of the time interval between data segments according to the task status; and if a largest value in the value range of the time interval between data segments is greater than a preset value, performing low power consumption communication.

With reference to the fifth possible implementation of the first aspect, in a seventh possible implementation, the determining, by the first network device according to the task status, whether to perform low power consumption communication includes: determining, by the first network device, an available value range of the time interval between data segments according to the task status; determining, by the first network device according to the battery recovery information, a smallest value of the time interval between data segments that is needed for the battery recovery; and if a largest value in the value range that is of the time interval between data segments and that is determined according to the task status is greater than the smallest value of the time interval between data segments that is needed for the battery recovery, performing low power consumption communication. Because a step of determining whether to perform low power consumption communication is added, when no suitable network resource can be allocated to the first network device, the first network device stops formulating the data interval policy, so that a processing time and a resource are saved, and network stability is enhanced.

With reference to the implementation of the first aspect, in an eighth possible implementation, the obtaining, by a first network device, a data interval policy includes: receiving, by the first network device, initial data interval information sent by the second network device, where the initial data interval information includes a value range of the data segment length and a value range of the time interval between data segments that can be used by the second network device to effectively perform battery recovery; and determining, by the first network device, the data interval policy in the initial data interval information according to the task status, where the data interval policy is favorable for the first network device to process in parallel multiple communication tasks. Because the first network device further considers, during the formulation of the data interval policy, the initial data interval information sent by the second network device, a battery recovery effect of the second network device exerted by the data interval policy is enhanced while executability of the data interval policy in a network is ensured. In addition, because the initial data interval information is formulated by the second network device, the first network device needs to process the initial data interval information only according to the task status of the first network device without considering the second network device. Therefore, in this embodiment, a computing resource and a storage resource needed by the first network device may be further reduced.

With reference to the eighth possible implementation of the first aspect, in a ninth possible implementation, before the determining, by the first network device, the data interval policy in the initial data interval information according to the task status, the method further includes: determining, by the first network device according to the task status and the initial data interval information, whether to perform low power consumption communication; and the determining, by the first network device, the data interval policy in the initial data interval information according to the task status includes: if determining to perform low power consumption communication, determining, by the first network device, the data interval policy in the initial data interval information according to the task status. Because a step of determining whether to perform low power consumption communication is added, when no suitable network resource can be allocated to the first network device, the first network device stops formulating the data interval policy, so that a processing time and a resource are saved, and network stability is enhanced.

With reference to the ninth possible implementation of the first aspect, in a tenth possible implementation, the determining, by the first network device according to the task status and the initial data interval information, whether to perform low power consumption communication includes: determining, by the first network device, a value range of the time interval between data segments according to the task status; and performing low power consumption communication if a largest value in the value range that is of the time interval between data segments and that is determined according to the task status is greater than a smallest value of the time interval between data segments that is in the initial data interval information.

With reference to the possible implementation of the first aspect, in an eleventh possible implementation, the obtaining, by a first network device, a data interval policy includes:

receiving, by the first network device, a battery recovery indication message sent by the second network device, where the battery recovery indication message is used to instruct the first network device to perform low power consumption communication; and determining, by the first network device, the data interval policy according to the task status.

With reference to the eleventh possible implementation of the first aspect, in a twelfth possible implementation, the determining, by the first network device, the data interval policy according to the task status includes: determining, by the first network device, an allocatable range of the data segment length and an allocatable range of the time interval between data segments according to the task status; and determining the data interval policy in the allocatable range of the data segment length and the allocatable range of the time interval between data segments, where the data interval policy is favorable for the first network device to process in parallel multiple communication tasks.

With reference to the eleventh or the twelfth possible implementation of the first aspect, in a thirteenth possible implementation, before the determining, by the first network device, the data interval policy, the method further includes: determining, by the first network device according to the task status, whether to perform low power consumption communication; and the determining, by the first network device, the data interval policy according to the task status includes: if determining to perform low power consumption communication, determining, by the first network device, the data interval policy according to the task status.

With reference to the thirteenth possible implementation of the first aspect, in a fourteenth possible implementation, the determining, by the first network device according to the task status, whether to perform low power consumption communication includes: determining, by the first network device, a value range of the time interval between data segments according to the task status; and performing low power consumption communication if a largest value in the value range of the time interval between data segments is greater than a preset value.

With reference to any one of the first aspect or the first to the fourteenth possible implementations of the first aspect, in a fifteenth possible implementation, the method is applied to an LTE coverage extension environment; and the data segment length in the data interval policy is an original data length or is an integer multiple of an original data length, and the original data length is a data length before spectrum spread in the coverage extension environment. Because the data segment length is an integer multiple of the original data length, the data does not need to be split during encoding and decoding, so that complexity of data segment encoding and decoding is reduced, thereby improving the encoding and decoding efficiency. In addition, because data sent during LTE coverage extension is extended and is repeatedly sent, a sending time of the data greatly increases compared with a common data sending time. In this way, a battery suffers from more severe non-linear discharge, and power consumption is increased. Therefore, when the method or a device in the present invention is applied to the LTE coverage extension environment, the impact of non-linear discharge on an electric quantity of a battery is more obviously reduced, and a battery recovery effect is more obviously enhanced.

According to a second aspect, an embodiment of the present invention provides a low power consumption communication method. The method includes: receiving, by a second network device, a data interval policy sent by a first network device, where the data interval policy is determined according to a task status of the first network device, so that the first network device can communicate, in the task status, with the second network device according to the data interval policy; and the data interval policy includes a data segment length and a time interval between data segments, where the time interval between data segments is used for recovering an electric quantity of a battery of the second network device; and sending, by the second network device, data to the first network device according to the data interval policy or receiving data that is sent by the first network device according to the data interval policy.

In a first possible implementation of the second aspect, before the receiving, by a second network device, a data interval policy sent by a first network device, the method further includes: sending, by the second network device, battery recovery information to the first network device, where the battery recovery information is used by the first network device to determine the data interval policy according to the task status and the battery recovery information.

With reference to the first possible implementation of the second aspect, in a second possible implementation, the battery recovery information includes information about a current status of the battery of the second network device and type information of the battery.

With reference to the second aspect, in a third possible implementation, before the receiving, by a second network device, a data interval policy sent by a first network device, the method further includes: sending, by the second network device, initial data interval information to the first network device, where the initial data interval information includes a value range of the data segment length and a value range of the time interval between data segments that can be used by the second network device to effectively perform battery recovery, and the initial data interval information is used by the first network device to determine the data interval policy according to the initial data interval information and the task status.

With reference to the second aspect, in a fourth possible implementation, before the receiving, by a second network device, a data interval policy sent by a first network device, the method further includes: sending, by the second network device, a battery recovery indication message to the first network device, where the battery recovery indication message is used to instruct the first network device to perform low power consumption communication.

With reference to the second aspect or the first to the fourth possible implementations of the second aspect, in a fifth possible implementation, the method is applied to an LTE coverage extension environment; and the data segment length in the data interval policy is an original data length or is an integer multiple of an original data length, and the original data length is a data length before spectrum spread in the coverage extension environment.

According to a third aspect, the present invention provides a low power consumption network device. The network device has a function of implementing the actions of the first network device in the method of the first aspect. The function may be implemented by using hardware, or may be implemented by hardware by executing corresponding software. The hardware or software includes one or more modules corresponding to the foregoing function.

According to a fourth aspect, the present invention provides a low power consumption network device. The network device has a function of implementing the actions of the second network device in the method of the second aspect. The function may be implemented by using hardware, or may be implemented by hardware by executing corresponding software. The hardware or software includes one or more modules corresponding to the foregoing function.

According to a fifth aspect, the present invention provides a network device. The network device has a function of implementing the actions of the first network device in the method of the first aspect. The device includes at least one processor, and the processor is configured to implement the corresponding functions in the foregoing method. The network device further includes a receiver and a transmitter, configured to support communication or instruction sending between the network device and a second network device. The device may further include a memory. The memory is configured to be coupled to the processor, and the memory stores a necessary program instruction and necessary data of the network device.

According to a sixth aspect, the present invention provides a network device. The network device has a function of implementing the actions of the second network device in the method of the second aspect. The network device includes a receiver and a transmitter, configured to support communication or instruction sending between the network device and a first network device. The device may further include at least one processor, and the processor is configured to implement the corresponding functions in the foregoing method. The device may further include a memory. The memory is configured to be coupled to the processor, and the memory stores a necessary program instruction and necessary data of the network device.

As can be learned, in the embodiments of the present invention, because the network devices at two ends communicating with each other both perform data transmission according to the data interval policy, data is sent at an interval. That is, the data is divided into multiple data segments, and a time interval is inserted between every two data segments. According to an aspect, because only one data segment is sent each time, a sending time for sending the data segment is shorter than a sending time for sending all the data, avoiding an increase in a battery consumption speed caused due to a non-linear discharge effect of a battery when the battery is discharged for a long time. According to another aspect, because a time interval is inserted between every two data segments, a part of an electric quantity of the battery may be recovered in the time interval due to a battery recovery effect. In this way, electricity consumption of a network device caused by communication is reduced, and a usage time of a battery of the network device is prolonged.

In addition, because the data interval policy for saving the electric quantity of the battery of the second network device is formulated by the first network device, adaptability of the communication method is enhanced. The first network device formulates the data interval policy according to the current task status of the first network device. Therefore, scheduling can be properly performed for each task of the first network device when low power consumption communication of the second network device is implemented, thereby improving usage effectiveness of a network resource of the first network device, and reducing the impact of the low power consumption communication on entire network communication.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

Embodiments of the present invention provide a method for performing low power consumption communication between network devices, to prolong a usage time of a battery of a network device, and reduce the impact of the low power consumption communication on efficiency of an entire network by using a negotiation mechanism between devices.

The embodiments of the present invention further provide a corresponding network device. Detailed descriptions are provided below separately.

The present invention is applied to communication between network devices. A second network device may be a network communications terminal powered by a battery, including a wired communications terminal and a wireless communications terminal such as a mobile phone, a portable communications device, or an Internet of Things communications terminal. Such a device is powered by a battery, and therefore may have the battery power consumption problem described in the background of the invention. A first network device may be a network device communicating with the second network device powered by a battery. The device may communicate with multiple network communications terminals at the same time, and therefore may have multiple communication tasks, for example, the first network device may be a base station, a computer, a router, or a gateway. When the first network device and the second network device perform communication, a communication policy is formulated by the first network device. The network device enables, by using the low power consumption communication method provided in the present invention, a network communications terminal communicating with the network device to implement low power consumption communication.

It should be noted that, the first network device and the second network device have no obvious difference in hardware. In different scenarios, a same network device may be used as the first network device or may be used as the second network device. For example, a smartphone may be used as the second network device to communicate with a base station used as the first network device. In addition, when the smartphone enables a hotspot function to provide a network resource for another network device, the smartphone may be used as the first network device in the present invention.

Figure 1:
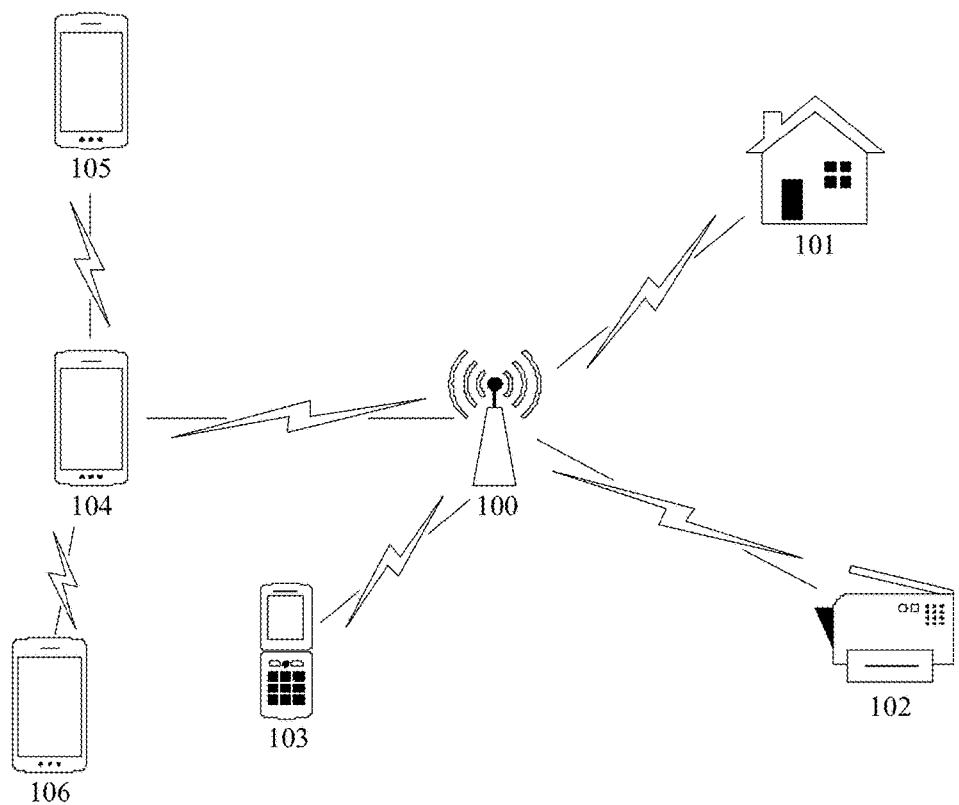
FIG. 1 is a schematic diagram of an embodiment of a network environment architecture according to the embodiments of the present invention.

With reference to FIG. 1, the following specifically describes an implementation of a network scenario to which a method provided in an embodiment of the present invention is applied. A device 100 is a wireless base station, and separately performs wireless communication with a smart household device 101, an intelligent Internet of Things device 102, a mobile phone 103, and an intelligent terminal 104. In this case, the device 100 may be used as the first network device in the embodiments of the present invention, and the devices 101, 102, 103, and 104 communicating with the device 100 may be second network devices. When any device 101, 102, 103, or 104 needs to perform low power consumption communication, the first network device formulates a low power consumption communication policy, and communicates, according to the low power consumption communication policy, with the device that needs to perform low power consumption communication. It may be understood that, because the first network device communicates with multiple devices at the same time, when formulating the low power consumption communication policy, in addition to considering how to reduce power consumption of the device that needs to perform low power consumption communication, the first network device further needs to consider whether the communication policy affects communication between the first network device and another network device. In addition, the intelligent terminal 104 may further enable a hotspot function, so as to be used as a hotspot for providing a network hotspot for intelligent terminals 105 and 106. Therefore, when the intelligent terminal 104 communicates with the device 100, the intelligent terminal 104 may be used as the second network device. The device 100 formulates a low power consumption communication policy and the intelligent terminal 104 communicates with the device 100 according to the policy. In addition, when the intelligent terminal 104 communicates with the intelligent terminals 105 and 106, the intelligent terminal 104 may be used as the first network device. The intelligent terminal 104 formulates a low power consumption communication policy for the intelligent terminal 105 or 106 and communicates with the intelligent terminal 105 or 106 according to the policy.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Figure 2:
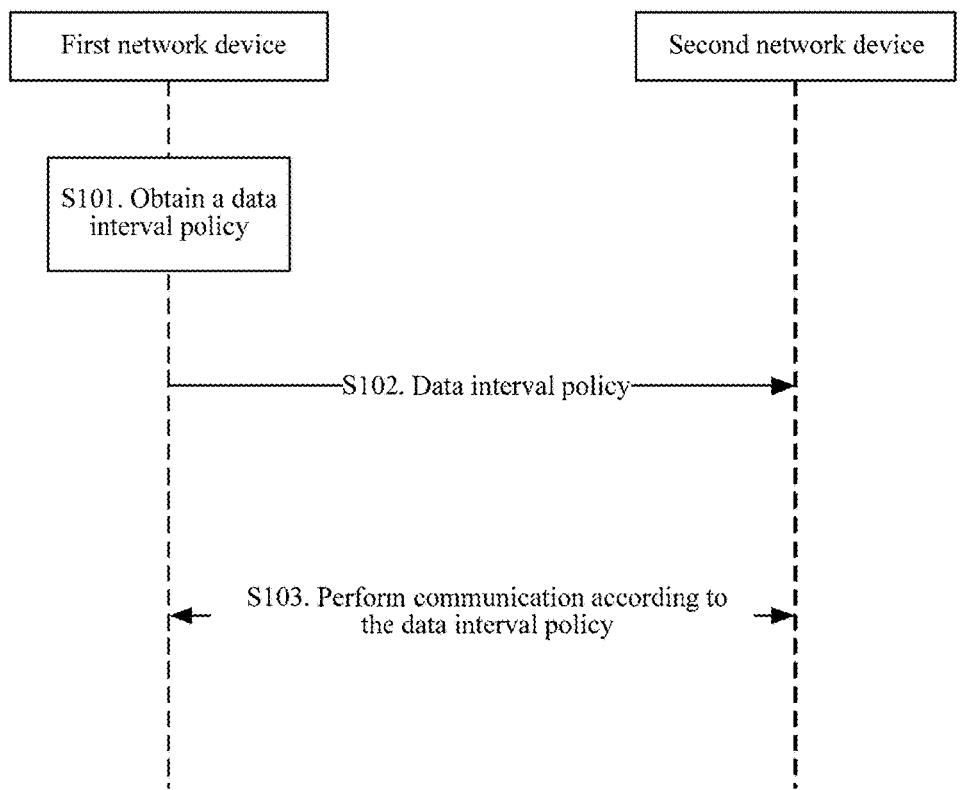
FIG. 2 is a schematic diagram of an embodiment of a procedure of interaction between network devices according to the embodiments of the present invention.

Referring to FIG. 2, FIG. 2 is a schematic diagram of an embodiment of a procedure of interaction between network devices according to the embodiments. A low power consumption communication method provided in this embodiment is described with reference to FIG. 2.

Step S101. A first network device obtains a data interval policy. The data interval policy is determined according to a task status of the first network device, so that the first network device can communicate, in the task status, with a second network device according to the data interval policy. The data interval policy includes a data segment length and a time interval between data segments, where the time interval between data segments is used for recovering an electric quantity of a battery of the second network device.

The data interval policy is a data transmission policy that includes information for determining the data segment length and the time interval between data segments. In the present invention, network devices perform negotiation, so that data is sent according to a specific duty cycle during data transmission. That is, the data is divided into multiple data segments. Each time after a data segment is sent, a time interval between data segments comes, and an electric quantity of a battery is recovered within the time according to a battery recovery effect. Then, another data segment is sent. This process is repeated until sending of the data is complete. The data interval policy is the policy of sending data according to a specific duty cycle. When communication is performed according to the data interval policy, according to an aspect, because only one data segment is sent each time, a sending time for sending data is shorter than a sending time for sending all the data, avoiding an increase in a battery consumption speed caused due to a non-linear discharge effect of a battery when the battery is discharged for a long time. According to another aspect, because a time interval is inserted between every two data segments, a part of an electric quantity of the battery may be recovered in the time interval due to the battery recovery effect. In this way, electricity consumption of a network device caused by communication is reduced, and a usage time of a battery of the network device is prolonged.

The task status may include a status of a current communication task and a status of a planned communication task of the network device. The network device may determine, according to the task status, a communication resource that can be allocated for this communication task. The communication resource that can be allocated to this communication task may be comprehensively determined according to communication resources that can be allocated to this communication task, so that the network device can efficiently use a communication resource during the low power consumption communication.

The data interval policy is determined according to the task status, so that the first network device can communicate, in the task status, with the second network device according to the data interval policy. Because communication resources that can be provided by the first network device for communication tasks are limited, the data interval policy that is formulated according to the task status should ensure that the communication resources not only can satisfy an existing communication task or an existing communication task and a planned communication task, but also can satisfy a communication task of the data interval policy.

The data interval policy may be formulated in multiple implementations according to different task statuses. For example, in a case, the first network device determines, according to the task status, a remaining communication resource, for example, a longest time that can be allocated for this low power consumption communication. The first network device may formulate, according to the longest time, a data interval policy that satisfies the time limitation. Alternatively, when the remaining communication resource is insufficient, the first network device may adjust an existing communication task or delay this low power consumption communication, to obtain a sufficient communication resource and formulate a data interval policy for low power consumption communication after the adjustment or delay. For another example, to use the communication resources at maximum efficiency, the communication task performed according to the data interval policy and a communication task sent at another interval are executed in parallel as much as possible. A time required for executing communication in the data segment length of the data interval policy may fall within an interval for executing another communication task, or another communication task may be performed within a time interval between data segments of the data interval policy.

The first network device obtains the data interval policy according to the task status of the first network device, but not limited to the task status. That is, the first network device may obtain the data interval policy only according to the task status of the first network device, or according to multiple factors including the task status of the first network device. Specifically, the data interval policy may be obtained by using different methods. Multiple methods for obtaining the data interval policy are illustrated in the following multiple embodiments, but the obtaining of the data interval policy should not be limited to the illustrated methods. Any method for obtaining the data interval policy by considering the task status should be considered as a method included in this step.

Step S102. The first network device sends the data interval policy to the second network device. The second network device receives the data interval policy sent by the first network device.

The data interval policy may be sent in multiple manners and content of the data interval policy may be in multiple forms. For example, when sending the data interval policy to the second network device, the first network device may send the data interval policy by using an individual message, or may integrate the data interval policy into another message. Content of the sent message may be a specific data interval policy, or may be an identifier corresponding to one of multiple data interval policies preset in the second network device.

Step S103. The first network device communicates with the second network device according to the data interval policy. Specifically, the first network device sends data to the second network device according to the data interval policy or receives data that is sent by the second network device according to the data interval policy, and the second network device sends the data to the first network device according to the data interval policy or receives the data that is sent by the first network device according to the data interval policy.

A battery recovery manner is not limited in this step. That is, the battery whose electric quantity is recovered within the time interval between data segments may be in a sleep state, a power-off state, or another state in which the battery recovery effect may take effect. A quantity of times of receiving or sending data is not limited. In a low power consumption communication process, if the first network device does not formulate a new data interval policy, a receiving or sending operation is performed according to the data interval policy again. If a new data interval policy is formulated, an operation is performed according to the new data interval policy. If the low power consumption communication process ends, a receiving or sending operation is not performed according to the data interval policy.

As can be learned, in this embodiment of the present invention, because the network devices at two ends communicating with each other both perform data transmission according to the data interval policy, data is sent at an interval. That is, the data is divided into multiple data segments, and a time interval is inserted between every two data segments. According to an aspect, because only one data segment is sent each time, a sending time for sending the data segment is shorter than a sending time for sending all the data, avoiding an increase in a battery consumption speed caused due to a non-linear discharge effect of a battery when the battery is discharged for a long time. According to another aspect, because a time interval is inserted between every two data segments, a part of an electric quantity of the battery may be recovered in the time interval due to a battery recovery effect. In this way, electricity consumption of a network device caused by communication is reduced, and a usage time of a battery of the network device is prolonged.

In addition, because the data interval policy for saving the electric quantity of the battery of the second network device is formulated by the first network device, adaptability of the communication method is enhanced. The first network device formulates the data interval policy according to the current task status of the first network device. Therefore, scheduling can be properly performed for each task of the first network device when low power consumption communication of the second network device is implemented, thereby improving usage effectiveness of a network resource of the first network device, and reducing the impact of the low power consumption communication on entire network communication.

Figure 3:
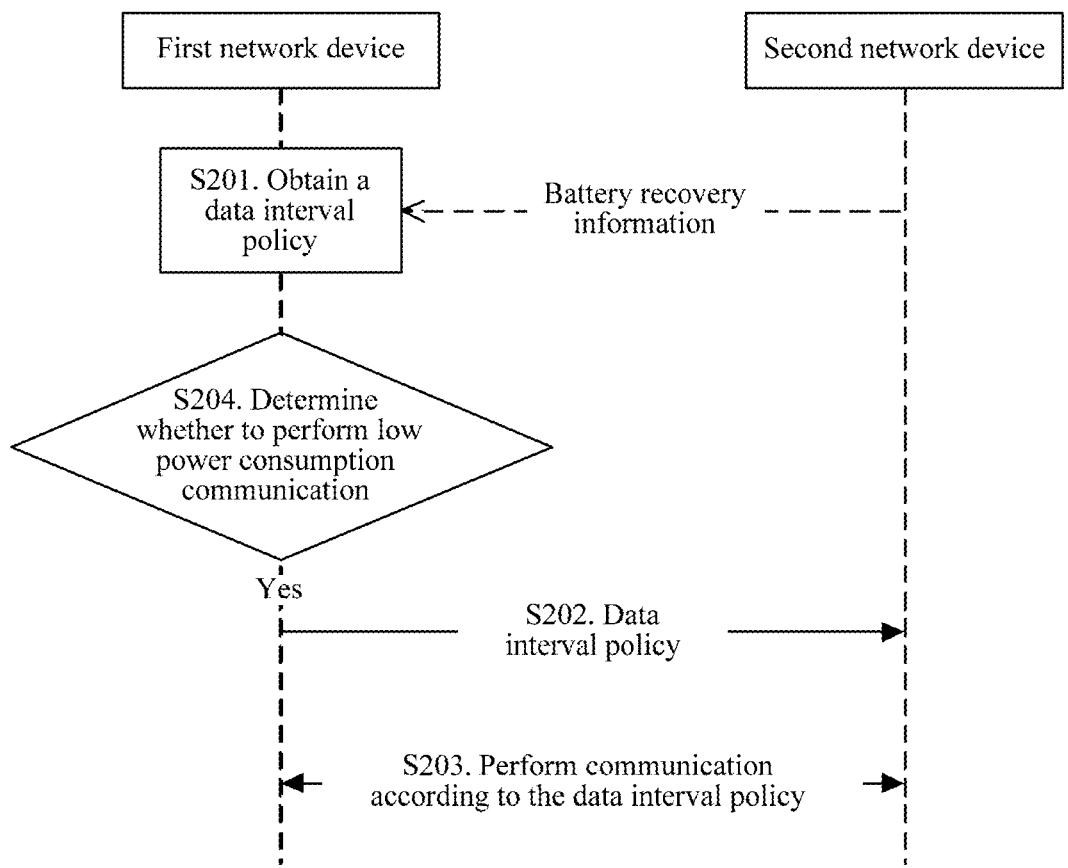
FIG. 3 is a schematic diagram of another embodiment of a procedure of interaction between network devices according to the embodiments of the present invention.

FIG. 3 is a schematic diagram of a second embodiment of a procedure of interaction between network devices according to the embodiments of the present invention. FIG. 3 is described with reference to FIG. 2. Step S202 and step S203 and step S102 and step S103 in the embodiment corresponding to FIG. 2 have same or similar descriptions, and details are not described herein again. This embodiment specifically includes the following steps.

S201. A second network device sends battery recovery information of the second network device to a first network device, and the first network device receives the battery recovery information of a battery of the second network device, and determines a data interval policy according to a task status and the battery recovery information.

The battery recovery information is information for describing a current status of the battery. Different batteries and a same battery in different usage statuses (for example, having different residual electric quantities, having different output currents, and the like) have different battery recovery degrees according to a battery recovery effect. The battery recovery information is information for describing various types of factors affecting a battery recovery degree.

Likewise, as described above, the first network device receives the battery recovery information sent by the second network device, and the battery recovery information may be sent in multiple manners and content of the battery recovery information may be in multiple forms. The sending manner and the content should not be limited.

The data interval policy is determined according to the task status and the battery recovery information. That is, the data interval policy is determined by using two factors: the task status and the battery recovery information. Specifically, a data segment length and a time interval of low power consumption communication that can be performed by using a communication resource of the first network device are determined according to the task status. It may be learned according to the recovery information that different data segment lengths and interval times have different battery recovery effects. According to different scheduling purposes of specific tasks, for example, to better arrange multiple communication tasks of the first network device, a data interval policy that is most favorable for the first network device to execute in parallel the multiple communication tasks may be selected from data interval policies having relatively desirable battery recovery effects. Alternatively, to better perform battery recovery on the second network device, a data interval policy that is most favorable for battery recovery may be selected from a range of data lengths and a range of interval times that can be provided by the first network device in the task status.

In a specific implementation, the determining, by the first network device, a data interval policy according to a task status and the battery recovery information may include: determining, by the first network device, a value range of the data segment length and a value range of the time interval between data segments according to the task status; and determining, in the value range of the data segment length and the value range of the time interval between data segments, a value of the data segment length and a value of the time interval between data segments according to the battery recovery information.

When a value is taken in the value range according to the battery recovery information, an optimum value that is favorable for the battery recovery may be determined according to the battery recovery information. Alternatively, a value range that is favorable for the battery recovery may be further determined according to the battery recovery information, and then a value is selected according to another condition.

Further, in an implementation, the battery recovery information may include information about the current status of the battery and type information of the battery.

Specifically, the determining, in the value range of the data segment length and the value range of the time interval between data segments, a value of the data segment length and a value of the time interval between data segments according to the battery recovery information may include: querying a preset corresponding battery type-based recovery effect model according to information about a battery status and information indicating a battery type, to obtain a correspondence that is between a recovery effect and a recovery time and that is of the battery type in the battery status; and selecting, from an allocatable range of the data segment length and an allocatable range of the time interval between data segments, a data segment length and a time interval between data segments that are most favorable for battery recovery of the second network device.

The corresponding battery type-based recovery effect model refers to, for a corresponding battery type, a correspondence that is of the type of battery in the battery status and that is between an electric quantity of the battery recovered due to a recovery effect and a recovery time.

It needs to be understood that, in this embodiment of the present invention, there may be different implementations that are most favorable for the battery recovery of the second network device. With reference to the descriptions in the background and the embodiment described above, in the data interval policy, electric quantities consumed for sending each data segment are different for different data segment lengths. When a total amount of data is fixed, a longer data segment length indicates that more electric quantities are consumed, due to a non-linear discharge effect, for sending all the data, a longer interval between data segments indicates that more electric quantities are recovered due to a battery recovery effect, and a relationship between a recovered electric quantity and a recovery time is also non-linear. Therefore, when an amount of data of a communication task is fixed and a communication time that can be allocated for the communication task is fixed, a shorter data segment length indicates that fewer electric quantities are consumed in total. However, when more data segments are obtained by means of division, a time interval between data segments is shorter. Formulating a data interval policy that is most favorable for battery recovery of a network device may be subtracting a sum of electric quantities that are recovered within interval times between data segments from a sum of electric quantities that are consumed for sending all data segments. A data interval policy with a smallest difference is the data interval policy that is most favorable for the battery recovery of the network device.

In some other implementations, favorable for the battery recovery of the second network device may be that an electric quantity of the battery that is recovered within an individual time interval for sending a data segment is the largest, or may be that an electric quantity that is recovered within data intervals after all data is transmitted is the largest.

Further, in an embodiment, before the determining, by the first network device, a data interval policy according to a task status and the battery recovery information, the method further includes the following step:

S204. The first network device determines, according to the task status, whether to perform low power consumption communication. If determining to perform low power consumption communication, the first network device determines the data interval policy according to the task status and the battery recovery information.

Multiple factors may be considered to determine whether to perform low power consumption communication. According to an aspect, it needs to determine whether an existing network resource of the first network device can satisfy a network resource required for performing low power consumption communication. Because a time interval between data segments needs to be inserted between data segments for the low power consumption communication, a total time required for completing one data transmission increases, and it needs to determine, according to the task status, whether a remaining network resource can satisfy a requirement of the low power consumption communication. According to another aspect, when low power consumption communication can be performed, a range of the time interval between data segments that may be used to perform low power consumption communication may be determined according to the task status. Further, it is determined whether a value in the range of the time interval can satisfy a requirement of the low power consumption communication on a power saving effect, so as to determine whether to perform low power consumption communication.

The value range of the time interval may be determined in multiple specific implementations. For example, a range of total duration that can be allocated for the low power consumption communication may be determined, and a range of total duration of the time interval between data segments is obtained by subtracting, from the duration, duration that is needed for this data transmission in which the time interval between data segments is inserted. Duration of each interval time is obtained by dividing a range of the total duration by a quantity of interval times between data segments. In addition, when multiple low power consumption communication needs to be executed in parallel alternately, or when low power consumption communication needs to be executed in parallel with another communication task, that is, when another data transmission that requires low power consumption communication or another communication task is performed within a time interval, the value range of the time interval between data segments needs to be comprehensively calculated with reference to a parallel status.

Figure 4A:
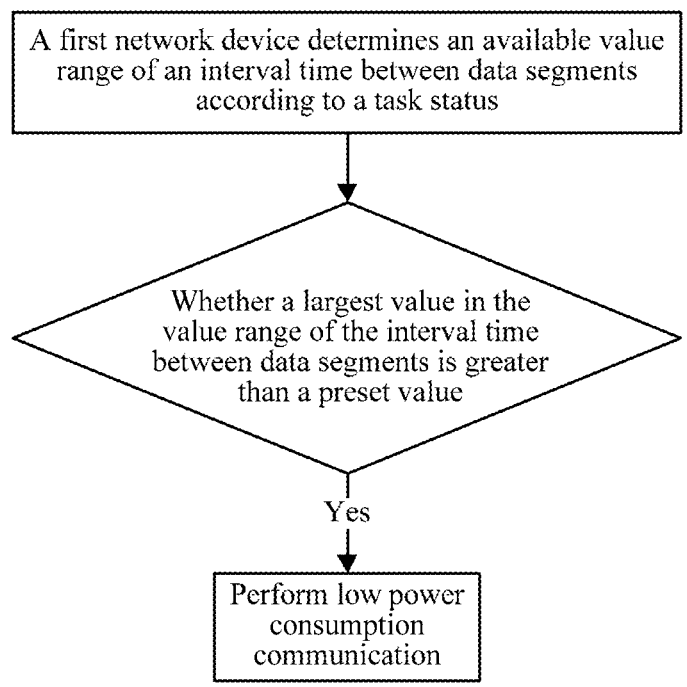
FIG. 4A is a schematic diagram of an embodiment of a method procedure for determining whether to perform low power consumption communication according to the embodiments of the present invention.

Specifically, in an implementation, as shown in FIG. 4A, the determining, by the first network device according to the task status, whether to perform low power consumption communication may include: determining, by the first network device, an available value range of the time interval between data segments according to the task status; and performing low power consumption communication if a largest value in the value range of the time interval between data segments is greater than a preset value.

The preset value is a smallest value of the time interval between data segments that can be used to effectively achieve a battery recovery effect. It may be understood that, the battery recovery effect takes effect as long as a time interval between data segments exists during sending of data. However, when the time interval is excessively short, a battery recovery time may be excessively short, and consequently, electric quantity recovery is not substantively valuable or cannot achieve an expected power saving effect. Therefore, the smallest value of the time interval is set, and when the largest value in the value range of the time interval is greater than the threshold, a value between the threshold and the largest value can satisfy a requirement for the battery recovery effect, and low power consumption communication may be performed. It should be noted that, the available value range of the time interval between data segments may be a value range of a sending time interval between two data segments, or may be a value range that equals to a sum of value ranges of all interval times between data segments during one data transmission.

Figure 4B:
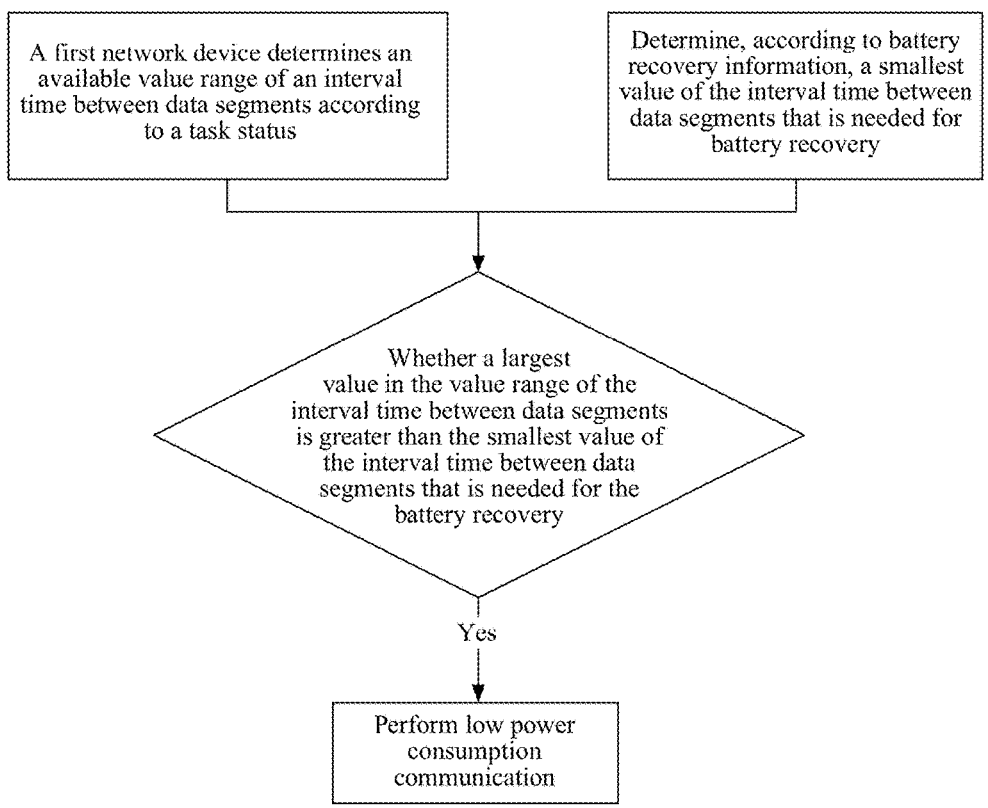
FIG. 4B is a schematic diagram of another embodiment of a method procedure for determining whether to perform low power consumption communication according to the embodiments of the present invention.

In another implementation, as shown in FIG. 4B, the first network device determines an available value range of the time interval between data segments according to the task status. The first network device determines, according to the battery recovery information, a smallest value of the time interval between data segments that is needed for the battery recovery, and performs low power consumption communication if a largest value in the value range that is of the time interval between data segments and that is determined according to the task status is greater than the smallest value of the time interval between data segments that is needed for the battery recovery. The implementation is similar to the implementation described above. When the largest value in the value range of the time interval between data segments is greater than the smallest value of the time interval between data segments that is needed for the battery recovery, it means that a value that can be used to effectively achieve a battery recovery effect exists in the value range of the time interval between data segments. Therefore, low power consumption communication may be performed.

After determining whether to perform low power consumption communication, the first network device may notify the second network device of a determining result in multiple manners, which include but are not limited to: sending a message of agreeing or refusing to perform low power consumption communication to a peer end; or agreeing on that sending, within a predetermined time period, a message of refusing to perform low power consumption communication means refusal, and not sending, within the predetermined time period, the message of refusing to perform low power consumption communication means agreement; or agreeing on that sending, within a predetermined time period, a message of agreeing to perform low power consumption communication means agreement, and not sending, within the predetermined time period, the message of agreeing to perform low power consumption communication means refusal.

In this embodiment of the present invention, in addition to the technical effect included in the embodiment corresponding to FIG. 1, because the first network device further considers the battery recovery information during the formulation of the data interval policy, a battery recovery effect of the second network device exerted by the data interval policy is enhanced while executability of the data interval policy in a network is ensured.

Further, in this embodiment of the present invention, because a step of determining whether to perform low power consumption communication is added, when no suitable network resource can be allocated to the first network device, the first network device stops formulating the data interval policy, so that a processing time and a resource are saved, and network stability is enhanced.

Figure 5:
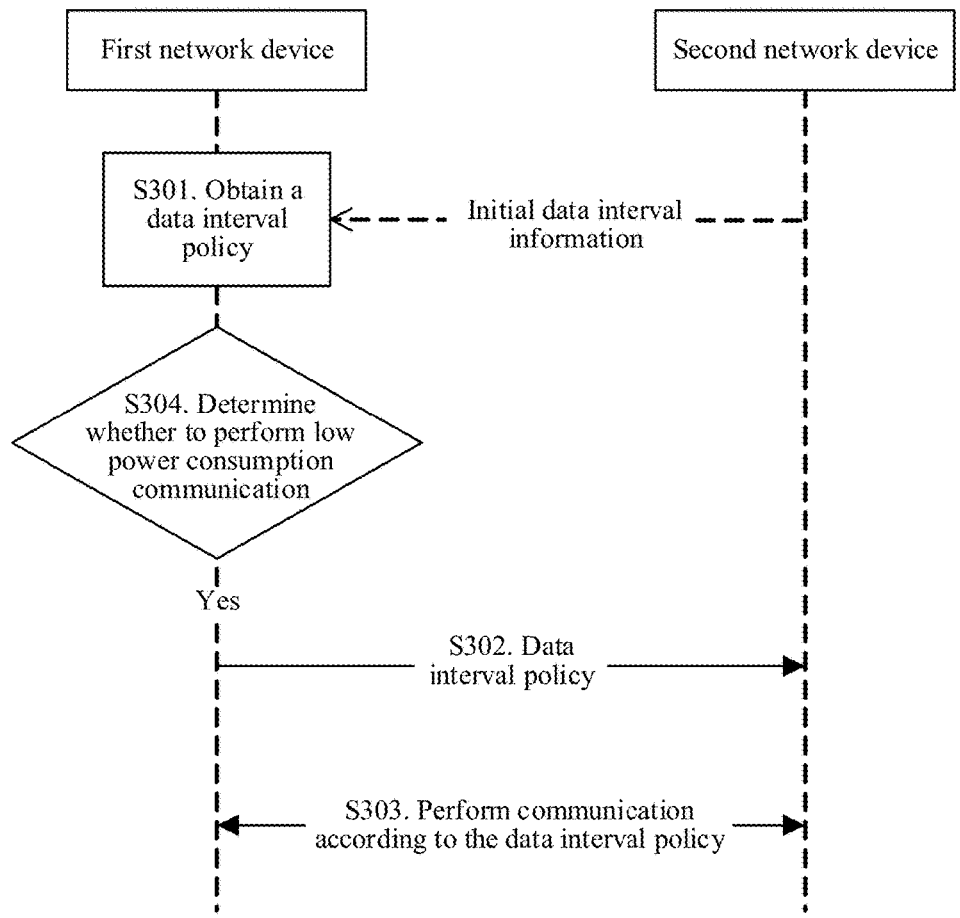
FIG. 5 is a schematic diagram of another embodiment of a procedure of interaction between network devices according to the embodiments of the present invention.

FIG. 5 is a schematic diagram of a third embodiment of a procedure of interaction between network devices according to the embodiments of the present invention. FIG. 5 is described with reference to FIG. 2. Step S302 and step S303 and step S102 and step S103 in the embodiment corresponding to FIG. 2 have same or similar descriptions, and details are not described herein again. This embodiment specifically includes the following steps.

S301. Before a second network device receives a data interval policy sent by a first network device, the second network device sends initial data interval information to the first network device, and the first network device receives the initial data interval information sent by the second network device, where the initial data interval information includes a value range of a data segment length and a value range of a time interval between data segments that can be used by the second network device to perform battery recovery. The first network device determines the data interval policy in the initial data interval information according to a task status, where the data interval policy is favorable for the first network device to process in parallel multiple communication tasks.

The initial data interval information may be the value range of the data segment length and the value range of the time interval between data segments that are determined by the second network device according to a battery status of the second network device and that can be used to recover a part of an electric quantity of a battery. Specifically, the second network device may obtain the initial data interval information in multiple manners, which include but are not limited to: p performing computation according to a battery type and the battery status to obtain a range of the data segment length and a range of the time interval between data segments that can satisfy a condition of a battery recovery effect; querying, according to the battery status of the second network device, a correspondence table between a time interval between data segments and an electric quantity recovery effect that are in a preset particular battery status, to obtain a range of the time interval between data segments that is needed for achieving an electric quantity recovery effect greater than a particular electric quantity recovery effect; querying, according to the battery status of the second network device, a correspondence table between a data segment length and a non-linear discharge consumed volume that are in a preset particular battery status, to obtain a range of the data segment length corresponding to a non-linear discharge consumed volume that is less than a particular non-linear discharge consumed volume; or querying, according to the battery status of the second network device, a correspondence table between a preset particular battery status, a value range of a data segment length, and a value range of a time interval between data segments, to obtain a corresponding value range of the data segment length and a corresponding value range of the time interval between data segments.

With reference to the description in FIG. 1 about a network environment of this method, the first network device performs network communication with multiple devices, and the communication tasks are usually performed in parallel. The data interval policy is favorable for the first network device to process in parallel multiple communication tasks. That is, when a resource needed for a communication task corresponding to the data interval policy can be allocated by the current first network device, the first network device can execute the multiple network tasks better. For example, the communication task can be performed in parallel with another communication task currently performed by the first network device, to make ultimate use of a network resource. Alternatively, the resource needed for the communication task corresponding to the data interval policy can be allocated by the current first network device and the time interval between data segments in the data interval policy may be used by the current first network device to execute another communication task.

Further, in an embodiment, before the determining, by the first network device, the data interval policy in the initial data interval information according to a task status, the method further includes the following step:

S304. The first network device determines, according to the task status and the initial data interval information, whether to perform low power consumption communication, and if determining to perform low power consumption communication, the first network device determines the data interval policy in the initial data interval information according to the task status.

That the first network device determines, according to the task status and the initial data interval information, whether to perform low power consumption communication is to determine whether the first network device can allocate a communication resource that satisfies the initial data interval information. Specifically, the determining, by the first network device according to the task status and the initial data interval information, whether to perform low power consumption communication may be: determining, by the first network device, a value range of the time interval between data segments according to the task status; and performing low power consumption communication if a largest value in the value range that is of the time interval between data segments and that is determined according to the task status is greater than a smallest value of the time interval between data segments that is in the initial data interval information. A determining principle herein is similar to a principle of determining whether to perform low power consumption communication in the foregoing embodiment, and may be understood with reference to the foregoing description.

As described above, after determining whether to perform low power consumption communication, the first network device may notify the second network device of the determining result in multiple manners. This is not limited in this method, and details are not described herein again.

In this embodiment of the present invention, in addition to the technical effect included in the embodiment corresponding to FIG. 1, because the first network device further considers, during the formulation of the data interval policy, an initial data interval information sent by the second network device, a battery recovery effect of the second network device exerted by the data interval policy is enhanced while executability of the data interval policy in a network is ensured. In addition, because the initial data interval information is formulated by the second network device, the first network device needs to process the initial data interval information only according to the task status of the first network device without considering the second network device. Specifically, for example, in an embodiment, the first network device does not need to query preset battery recovery models according to the battery type of the second network device. Therefore, in this embodiment, a computing resource and a storage resource needed by the first network device may be further reduced.

Further, in this embodiment of the present invention, because a step of determining whether to perform low power consumption communication is added, when no suitable network resource can be allocated to the first network device, the first network device stops formulating the data interval policy, so that a processing time and a resource are saved, and network stability is enhanced.

Figure 6:
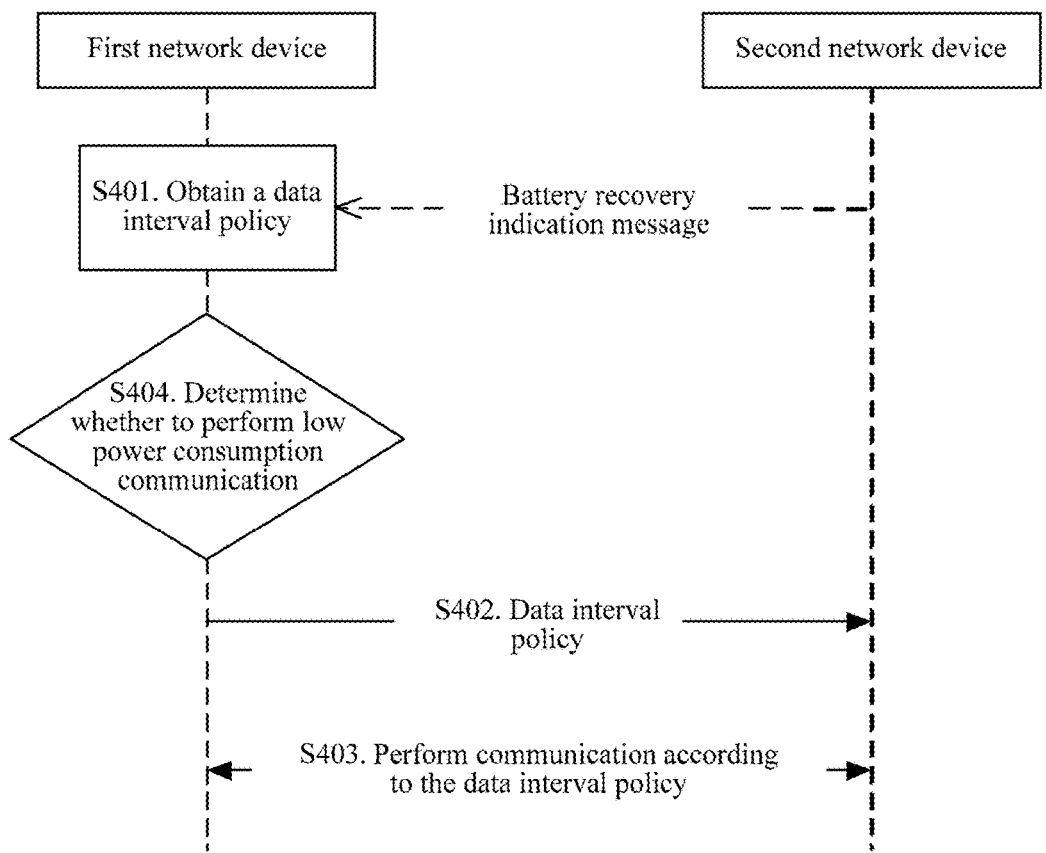
FIG. 6 is a schematic diagram of another embodiment of a procedure of interaction between network devices according to the embodiments of the present invention.

FIG. 6 is a schematic diagram of a fourth embodiment of a procedure of interaction between network devices according to the embodiments of the present invention. FIG. 6 is described with reference to FIG. 2. Step S402 and step S403 and step S102 and step S103 in the embodiment corresponding to FIG. 2 have same or similar descriptions, and details are not described herein again. This embodiment specifically includes the following step.

S401. Before a second network device receives a data interval policy sent by a first network device, the second network device sends a battery recovery indication message to the first network device, and the first network device receives the battery recovery indication message sent by the second network device, where the battery recovery indication message is used to instruct the first network device to perform low power consumption communication. The first network device determines the data interval policy according to a task status.

The battery recovery indication message is used to instruct the first network device to perform low power consumption communication. The battery recovery indication message may have only an indication function and does not include other information, or may include other information, for example, device type information of the second network device or type information of a battery of the second network device, that helps the first network device determine a type of a peer end that performs low power consumption communication. However, the battery recovery indication message is different from the battery recovery information in the embodiment described above, and the battery recovery indication message does not include information about a current battery status of the second network device.

Specifically, in a specific implementation, the determining, by the first network device, the data interval policy according to a task status includes: determining, by the first network device, an allocatable range of the data segment length and an allocatable range of the time interval between data segments according to the task status; and determining the data interval policy in the allocatable range of the data segment length and the allocatable range of the time interval between data segments, where the data interval policy is favorable for the first network device to process in parallel multiple communication tasks. A determining principle herein is similar to a principle of determining whether to perform low power consumption communication in the embodiment described above, and may be understood with reference to the foregoing description.

With reference to the foregoing embodiment, that the data interval policy is favorable for the first network device to process in parallel multiple communication tasks has multiple implementations. For example, a resource needed for a communication task corresponding to the data interval policy can be allocated by the current first network device and the communication task can be performed in parallel with another communication task currently performed by the first network device. Alternatively, a resource needed for a communication task corresponding to the data interval policy can be allocated by the current first network device and the time interval between data segments in the data interval policy may be used by the current first network device to execute another communication task.

Further, in a specific implementation, before the determining, by the first network device, the data interval policy, the method further includes:

determining, by the first network device according to the task status, whether to perform low power consumption communication; and if determining to perform low power consumption communication, determining, by the first network device, the data interval policy according to the task status.

Multiple determining manners may be used by the first network device to determine, according to the task status, whether to perform low power consumption communication. The multiple determining manners include but are not limited to: determining whether the first network device can allocate a communication resource for the low power consumption communication according to the task status; or determining whether a current communication resource that can be allocated by the first network device according to the task status satisfies a preset value.

Specifically, in a specific implementation, the determining, by the first network device according to the task status, whether to perform low power consumption communication includes: determining, by the first network device, a value range of the time interval between data segments according to the task status; and performing low power consumption communication if a largest value in the value range of the time interval between data segments is greater than a preset value.

In this embodiment, in addition to the technical effect included in the embodiment corresponding to FIG. 1, because the first network device formulates the data interval policy only according to the task status of the first network device and does not need to further consider a status of the second network device during the formulation of the data interval policy, flexibility of formulating the data interval policy is enhanced, and especially when the first network device processes in parallel relatively many communication tasks, an allocatable network resource may be used to an ultimate extent to perform low power consumption communication. In addition, in this embodiment, because the second network device only needs to send the battery recovery indication message, and does not need to perform an operation related to policy formulation, the obtaining of the battery status, or the like, a requirement of the second network device on a computing resource is reduced. Therefore, this embodiment is applicable to a scenario in which the second network device does not have a computation capability.

Further, in this embodiment, because a step of determining whether to perform low power consumption communication is added, when no suitable network resource can be allocated to the first network device, the first network device stops formulating the data interval policy, so that a processing time and a resource are saved, and network stability is enhanced.

The following uses an application scenario in which a base station (Base Station, BS for short) and a terminal (User Equipment, UE for short) perform, in an LTE network environment, low power consumption communication provided in the present invention, to specifically describe an implementation of the present invention in the application scenario.

An uplink sending and scheduling process is as follows:

The UE receives, on a synchronous channel, a synchronization message sent by the BS, performs a synchronization operation, and parses content of a SIB message after the synchronization succeeds.

If the UE has uplink data to be sent, the UE determines whether there is a power saving requirement, and if there is a power saving requirement, adds a battery recovery indication to an uplink access request message. Then, switching to a physical random access channel (Physical Random Access Channel, PRACH for short) is performed. A message indicating that there is data needing to be sent is added to the uplink access request message, and an uplink sending request is initiated.

After receiving the uplink sending request of the UE, the BS schedules and allocates, for the UE according to the battery recovery indication in the uplink sending request of the UE, a resource that is favorable for battery recovery, and schedules and allocates a suitable interval according to a resource usage status. An uplink resource is scheduled and allocated for the UE according to a scheduling task table, and information about the scheduled resource and interval indication information are added to a downlink control information (Downlink Control Information, DCI for short) broadcast message. The UE listens to the DCI broadcast message and parses the uplink UL resource that is allocated by the BS to the UE.

The UE sends, according to the interval indication information at an interval, the data on the UL resource that is allocated by the BS to the UE.

The BS receives a data message on the UL resource, determines an uplink resource sending granularity of the UE according to the interval indication information, receives the data segment by segment, combines all segment information, and finally decodes the data, and sends a response on a downlink data channel after the decoding is complete.

A downlink sending and scheduling process is as follows:

The terminal UE receives, on a synchronous channel, a synchronization message sent by the base station BS, performs a synchronization operation, and parses content of the message after the synchronization succeeds.

According to the content of the message, the UE is instructed to parse a DCI message on a DCI broadcast channel.

The UE is switched to a PRACH channel to determine whether there is a power saving requirement, and if there is a power saving requirement, adds a battery recovery indication to an access request message and initiates an uplink access request message.

After receiving the access request message of the UE, if there is readily data sent to the UE, the BS schedules and allocates, for the UE according to the battery recovery indication in the uplink request of the UE, a resource that is favorable for battery recovery, and schedules and allocates a suitable interval according to a resource usage status. A downlink resource is scheduled and allocated for the UE according to a scheduling task table, and information about the scheduled resource is added to a downlink DCI broadcast message. The UE listens to the DCI broadcast message and parses the downlink resource that is allocated by the BS to the UE.

The BS sends, at an interval, the data on the resource allocated to the UE.

The UE receives a data message at an interval on the resource, determines a downlink resource sending granularity of the BS according to interval indication information, receives the data segment by segment, combines all segment information, and finally decodes the data and sends a response at an interval on an uplink data channel.

With reference to the methods described in the first to the fourth method embodiments, it should be easily understood that, a specific implementation in an LTE network scenario may be correspondingly extended or changed to an implementation corresponding to the methods in the embodiments. For example, the battery recovery indication message that is sent by the UE to the BS may be changed to battery recovery information, and the BS allocates, according to the battery recovery information and a resource usage status, a resource that is favorable for the battery recovery to the UE. Alternatively, the UE sends a data interval range that is favorable for the battery recovery of the UE to the BS, and the BS allocates, according to the data interval range and a resource usage status, a resource that is favorable for the battery recovery to the UE. Similar extension and changes are not described herein in detail.

Figure 7:
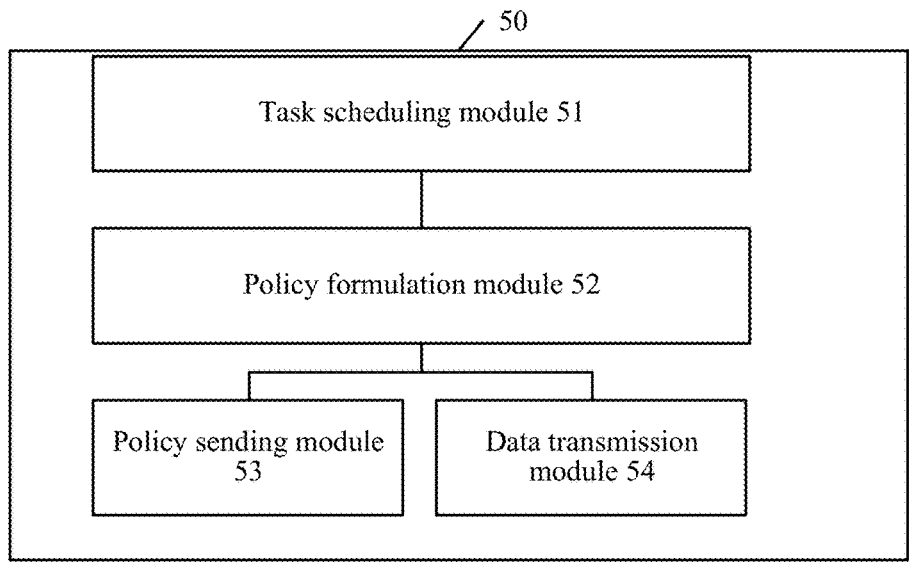
FIG. 7 is a schematic diagram of an embodiment of a function module of a network device according to the embodiments of the present invention.

Referring to FIG. 7, FIG. 7 is a schematic structural diagram of an embodiment of a low power consumption network device 50 according to the present invention. The network device 50 performs all or a part of the method performed by the first network device in the first embodiment described above. Therefore, the descriptions of the concepts in the embodiment described above that are related to this embodiment may also be used in this embodiment. The network device includes:

a task scheduling module 51, configured to: determine a task status according to a task status of the current device, and transmit the task status to a policy formulation module 52;

the policy formulation module 52, configured to: receive the task status from the task scheduling module 51, determine a data interval policy, and transmit the data interval policy to a policy sending module 53 and a data transmission module 54, where the data interval policy is determined according to the task status; and the data interval policy includes a data segment length and a time interval between data segments, where the time interval between data segments is used for recovering an electric quantity of a battery of a second network device;

the policy sending module 53, configured to: receive the data interval policy from the policy formulation module, and send the data interval policy to the second network device; and the data transmission module 54, configured to: receive the data interval policy from the policy formulation module, and send data to the second network device according to the data interval policy or receive data that is sent by the second network device according to the data interval policy.

In the network device of this embodiment, the policy formulation module 52 formulates the data interval policy according to the task status that is sent by the task scheduling module 51, and sends the data interval policy to the policy sending module 53 The policy sending module 53 sends the data interval policy to the second network device, so that the second network device can perform low power consumption communication with this network device according to the data interval policy. The policy formulation module further sends the data interval policy to the data transmission module 54, so that the data transmission module 54 can communicate with the second network device according to the data interval policy.

Figure 8:
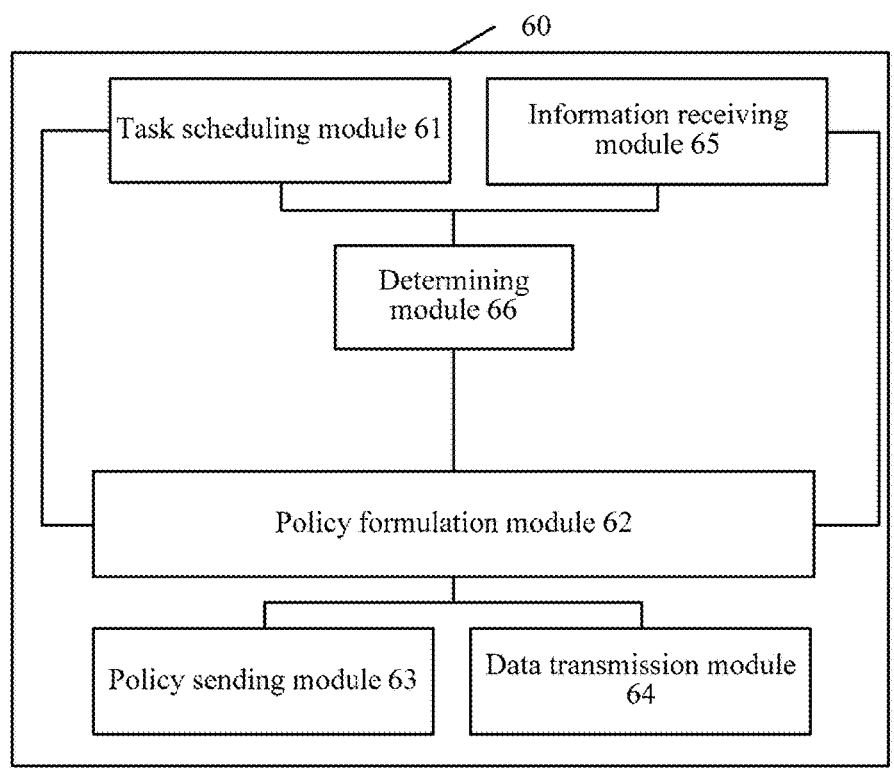
FIG. 8 is a schematic diagram of another embodiment of a function module of a network device according to the embodiments of the present invention.

Referring to FIG. 8, FIG. 8 is a schematic structural diagram of an embodiment of another low power consumption network device 60 according to the embodiments of the present invention. FIG. 8 is described with reference to FIG. 7. Modules 61, 62, 63, and 64 and modules 51, 52, 53, and 54 have same or similar descriptions, and details are not described herein again. The network device 60 performs all or a part of the method performed by the first network device in the embodiment described above, and therefore, the descriptions of the concepts in the embodiment described above that are related to this embodiment may also be used in this embodiment. The network device in this embodiment further includes:

an information receiving module 65, configured to: receive information sent by the second network device, and transmit the information to the policy formulation module.

Further, in a specific implementation, the network device may further include:

a determining module 66, configured to: determine whether to perform low power consumption communication, and if low power consumption communication is to be performed, instruct the policy formulation module to determine the data interval policy.

The task scheduling module 61 is further configured to transmit the task status to the determining module 66.

In a specific implementation in this embodiment, the information receiving module 65 is specifically configured to: receive battery recovery information sent by the second network device, and transmit the battery recovery information to the policy formulation module 62 and the determining module 66.

The policy formulation module 62 is further configured to receive the battery recovery information sent by the information receiving module, and the determining a data interval policy specifically includes: formulating the data interval policy according to the task status and the battery recovery information. The determining the data interval policy according to the task status and the battery recovery information may include: determining a value range of the data segment length and a value range of the time interval between data segments according to the task status; and determining, in the value range of the data segment length and the value range of the time interval between data segments, a value of the data segment length and a value of the time interval between data segments according to the battery recovery information.

Further, the battery recovery information may include information about a current status of the battery of the second network device and type information of the battery. The determining, in the value range of the data segment length and the value range of the time interval between data segments, a value of the data segment length and a value of the time interval between data segments according to the battery recovery information may include: querying a preset corresponding battery type-based recovery effect model according to information about a battery status and information indicating a battery type, to select, from an allocatable range of the data segment length and an allocatable range of the time interval between data segments, a data segment length and a time interval between data segments that are most favorable for battery recovery of a peer end.

The determining module 66 is configured to: receive the task status that is sent by the task scheduling module, determine, according to the task status, whether to perform low power consumption communication, and if determining to perform low power consumption communication, instruct the policy formulation module to determine the data interval policy. Further, the determining, according to the task status, whether to perform low power consumption communication may specifically include: determining a value range of the time interval between data segments according to the task status; and performing low power consumption communication if a largest value in the value range of the time interval between data segments is greater than a preset value.

Alternatively, the determining module 66 is further configured to: receive the battery recovery information sent by the information receiving module. The determining, according to the task status, whether to perform low power consumption communication specifically includes: determining a value range of the time interval between data segments according to the task status; determining, according to the battery recovery information, a smallest value of the time interval between data segments that is needed for the battery recovery; and performing low power consumption communication if a largest value in the value range that is of the time interval between data segments and that is determined according to the task status is greater than the smallest value of the time interval between data segments that is needed for the battery recovery.

In another specific implementation in this embodiment, the information receiving module 65 may be configured to: receive initial data interval information sent by the second network device, and transmit the initial data interval information to the policy formulation module 62 and the determining module 66. The initial data interval information includes a value range of the data segment length and a value range of the time interval between data segments that are used by the second network device to perform battery recovery.

The policy formulation module 62 is further configured to receive the initial data interval information sent by the information receiving module, and the determining a data interval policy specifically includes: determining the data interval policy in the initial data interval information according to the task status, where the data interval policy is favorable for the network device to process in parallel multiple communication tasks.

The determining module 66 is configured to: receive the task status that is sent by the task scheduling module 61 and the initial data interval information sent by the information receiving module 65; determine a value range of the time interval between data segments according to the task status; and perform low power consumption communication if a largest value in the value range that is of the time interval between data segments and that is determined according to the task status is greater than a smallest value of the time interval between data segments that is in the initial data interval information.

In still another implementation in this embodiment, the information receiving module 65 is configured to: receive initial data interval information sent by the second network device, and transmit the initial data interval information to the policy formulation module 62. The initial data interval information includes a value range of the data segment length and a value range of the time interval between data segments that are used by the second network device to perform battery recovery.

The policy formulation module 62 is further configured to receive the initial data interval information sent by the information receiving module, and the determining a data interval policy specifically includes: determining the data interval policy in the initial data interval information according to the task status, where the data interval policy is favorable for the network device to process in parallel multiple communication tasks.

The determining module 66 is configured to: receive the task status that is sent by the task scheduling module 61 and the initial data interval information sent by the information receiving module 65; determine a value range of the time interval between data segments according to the task status; and perform low power consumption communication if a largest value in the value range that is of the time interval between data segments and that is determined according to the task status is greater than a smallest value of the time interval between data segments that is in the initial data interval information.

Figure 9A:
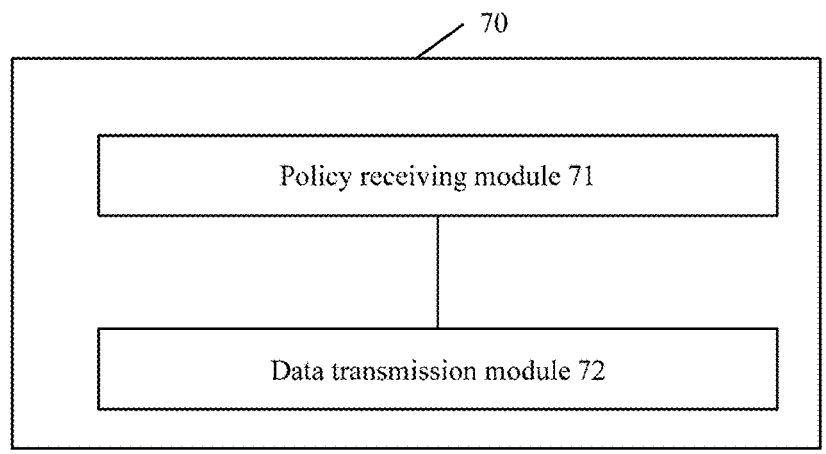
FIG. 9A is a schematic diagram of another embodiment of a function module of a network device according to the embodiments of the present invention.

Referring to FIG. 9A, FIG. 9A is a schematic structural diagram of an embodiment of another low power consumption network device 70 according to the present invention. The network device 70 performs all or a part of the method performed by the second network device in the embodiment described above. Therefore, the descriptions of the concepts in the embodiment described above that are related to this embodiment may also be used in this embodiment. The network device in this embodiment includes:

a policy receiving module 71, configured to: receive a data interval policy sent by a first network device, and transmit the data interval policy to a data transmission module 72, where the data interval policy is determined according to a task status of the first network device; and the data interval policy includes a data segment length and a time interval between data segments, where the time interval between data segments is used for recovering an electric quantity of a battery of this network device; and the data transmission module 72, configured to: receive the data interval policy from the policy receiving module 71, and send data to the first network device according to the data interval policy or receive data that is sent by the first network device according to the data interval policy.

Figure 9B:
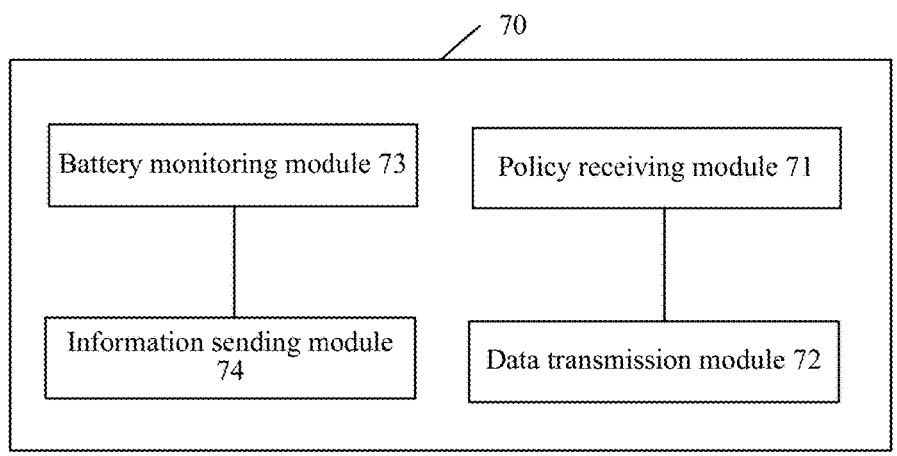
FIG. 9B is a schematic diagram of another embodiment of a function module of a network device according to the embodiments of the present invention.

Further, in an embodiment, with reference to FIG. 9B, based on FIG. 9A, the network device further includes:

a battery monitoring module 73, configured to: obtain battery recovery information of this network device, and transmit the battery recovery information to an information sending module 74, where the battery recovery information is used by the first network device to determine the data interval policy according to the task status and the battery recovery information.

Specifically, the battery recovery information may include information about a current status of the battery of this network device and type information of the battery.

The information sending module 74 is configured to: receive the battery recovery information sent by the battery monitoring module, and send the battery recovery information to the first network device.

Figure 9C:
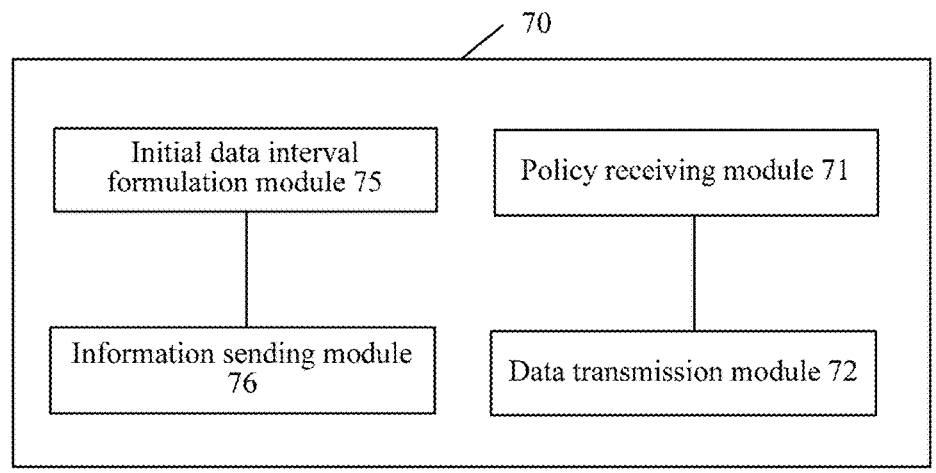
FIG. 9C is a schematic diagram of another embodiment of a function module of a network device according to the embodiments of the present invention.

In another embodiment, with reference to FIG. 9C, based on FIG. 9A, the network device further includes:

an initial data interval formulation module 75, configured to: obtain initial data interval information, and transmit the initial data interval information to an information sending module 76, where the initial data interval information includes the current status of the battery of this network device, and a value range of the data segment length and a value range of the time interval between segments that are favorable for battery recovery of this network device and that are obtained by querying a preset battery recovery effect model; and the information sending module 76, configured to: receive the initial data interval information sent by the data interval formulation module, and send the initial data interval information to the first network device.

Figure 9D:
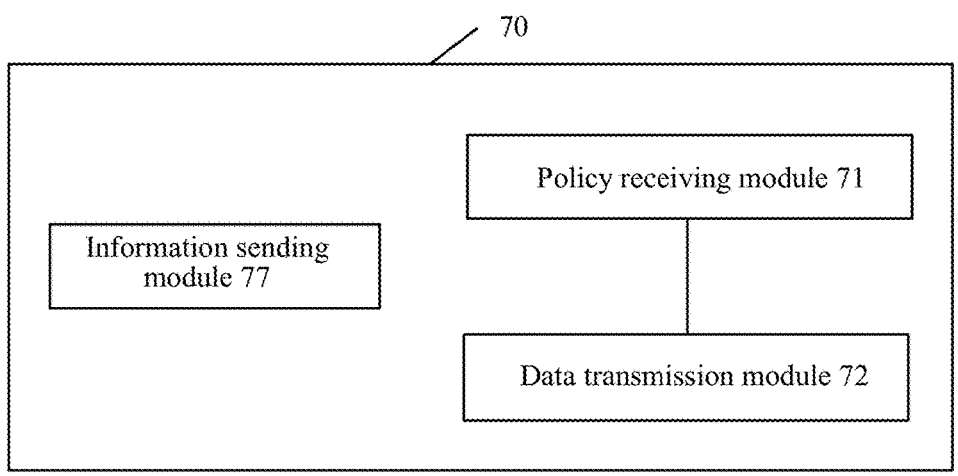
FIG. 9D is a schematic diagram of another embodiment of a function module of a network device according to the embodiments of the present invention.

In another embodiment, with reference to FIG. 9D, based on FIG. 9A, the network device further includes:

an information sending module 77, configured to: send a battery recovery indication message to the first network device, where the battery recovery indication message is used to instruct the first network device to perform low power consumption communication.

In a specific implementation, the first network device and the second network device in the figure described above may be a base station and a terminal. In the specific implementation, with reference to FIG. 7, the network device may be specifically implemented as a base station. The data transmission module 54 is specifically a radio frequency transmitter, a radio frequency receiver, and a baseband processing unit that controls the radio frequency transmitter and the radio frequency receiver, so as to send or receive data according to the data interval policy. The policy sending module is a radio frequency transmitter, and may send the data interval policy. The task scheduling module 51 and the policy formulation module 52 may be implemented by a processing chip by reading program code stored in a register. Correspondingly, with reference to FIG. 9A, the network device may be specifically implemented as a terminal device. The data transmission module 72 may be a radio frequency transmitter, a radio frequency receiver, and a baseband processing unit that controls the radio frequency transmitter and the radio frequency receiver, so as to send or receive data according to the data interval policy. The policy receiving module may be a radio frequency receiver, configured to receive the data interval policy.

Figure 10:
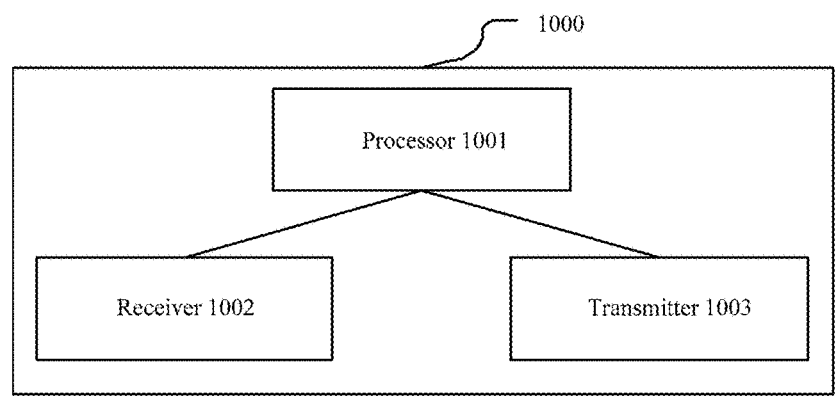
FIG. 10 is a schematic structural diagram of a network device according to an embodiment of the present invention.

With reference to FIG. 10, FIG. 10 is a schematic structural diagram of a network device 1000 according to an embodiment of the present invention. The network device has a function of implementing the actions of the first network device or the second network device in the foregoing methods. The device includes at least one processor 1001, and the processor is configured to implement the corresponding functions in the foregoing methods. The network device further includes a receiver 1002 and a transmitter 1003, configured to support communication or instruction sending between the network device and a first network device or a second network device at a peer end. The device may further include a memory. The memory is configured to be coupled to the processor, and the memory stores a necessary program instruction and necessary data of the network device.

In an implementation of this embodiment, the network device may be used as the first network device in the methods described above to implement the corresponding functions.

The at least one processor may be configured to obtain a data interval policy, where the data interval policy is determined according to a task status of the network device, so that the network device can communicate, in the task status, with the second network device according to the data interval policy. The data interval policy includes a data segment length and a time interval between data segments, and the time interval between data segments is used for recovering an electric quantity of a battery of the second network device.

The receiver and the transmitter may be configured to: send the data interval policy to the second network device, and send data to the second network device according to the data interval policy or receive data that is sent by the second network device according to the data interval policy.

Optionally, the processor is specifically configured to: when determining the data interval policy, formulate the data interval policy according to the task status and the battery recovery information.

Alternatively, the receiver is further configured to receive a battery recovery indication message sent by the second network device, where the battery recovery indication message is used to instruct the first network device to perform low power consumption communication. The processor is specifically configured to: when determining the data interval policy, formulate the data interval policy according to the task status.

Alternatively, the receiver is further configured to receive initial data interval information sent by the second network device, where the initial data interval information includes a value range of the data segment length and a value range of the time interval between data segments that can be used by the second network device to effectively perform battery recovery. The processor is specifically configured to: when determining the data interval policy, determine the data interval policy in the initial data interval information according to the task status, where the data interval policy is favorable for the first network device to process in parallel multiple communication tasks.

Optionally, the processor may be further configured to: before determining the data interval policy, determine whether to perform low power consumption communication; and if determining to perform low power consumption communication, obtain the data interval policy.

Corresponding to the embodiment described above, the network device in this embodiment may further implement a specific implementation or an optional implementation of the method, and details are not described herein.

In another implementation of this embodiment, the network device may be used as the second network device in the methods described above to implement the corresponding functions.

The receiver and the transmitter may be configured to: receive a data interval policy sent by a first network device, where the data interval policy is determined according to a task status of the first network device, so that the first network device can communicate, in the task status, with this network device according to the data interval policy; and the data interval policy includes a data segment length and a time interval between data segments, where the time interval between data segments is used for recovering an electric quantity of a battery of this network device; and send data to the first network device according to the data interval policy or receive data that is sent by the first network device according to the data interval policy.

Optionally, the network device further includes the processor, which may be configured to: obtain battery recovery information of this network device, where the battery recovery information is used by the first network device to determine the data interval policy according to the task status and the battery recovery information. The transmitter may be further configured to send the battery recovery information to the first network device.

Optionally, the network device further includes the processor, which may be configured to: obtain initial data interval information, where the initial data interval information includes a value range of the data segment length and a value range of the time interval between data segments that can be used by the second network device to effectively perform battery recovery, and the initial data interval information is used by the first network device to determine the data interval policy according to the initial data interval information and the task status. The transmitter may be further configured to send the initial data interval information to the first network device.

Optionally, the transmitter may be further configured to send a battery recovery indication message to the first network device, where the battery recovery indication message is used to instruct the first network device to perform low power consumption communication.

Figure 11:
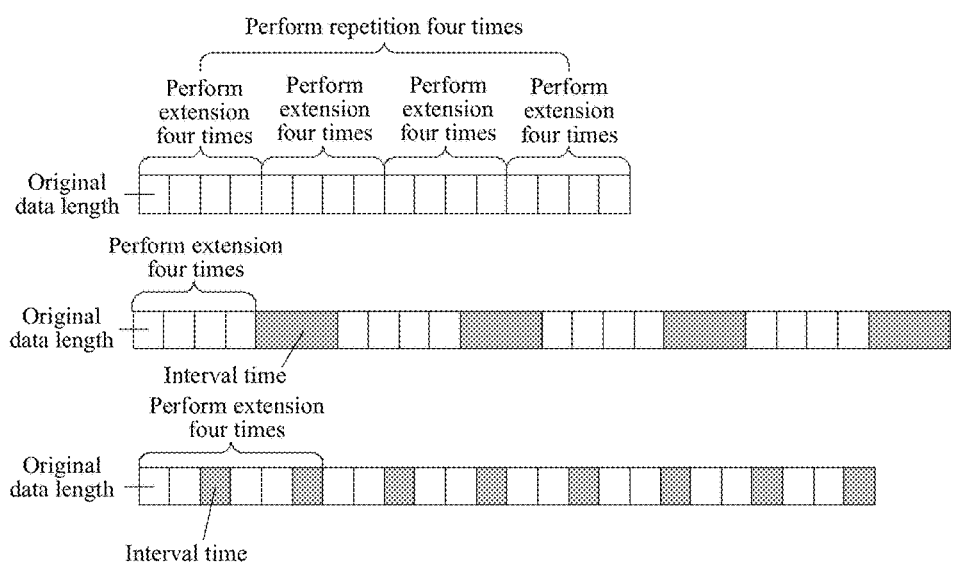
FIG. 11 is a schematic diagram of another embodiment applied to an LTE coverage extension scenario according to the embodiments of the present invention.

With reference to FIG. 11, in a specific implementation of each embodiment described above of the present invention, the method or device further includes: applying the method or device to an LTE coverage extension environment. The data segment length in the data interval policy is an original data length or is an integer multiple of an original data length, and the original data length is a data length before spectrum spread in the coverage extension environment.

LTE coverage extension may extend a coverage range by using a transmission mode of performing spectrum spread four times and performing repetition four times. In the coverage extension environment, the data segment length may be set to the data length before spectrum spread in the coverage extension environment or an integer multiple of the data length. For example, FIG. 11 illustrates cases in which the data segment length is set to four times the original data length and twice the original data length. Because the data segment length is an integer multiple of the original data length, the data does not need to be split during encoding and decoding, so that complexity of data segment encoding and decoding is reduced, thereby improving the encoding and decoding efficiency. In addition, because data sent during LTE coverage extension is extended and is repeatedly sent, a sending time of the data greatly increases compared with a common data sending time. In this way, a battery suffers from more severe non-linear discharge, and power consumption is increased. Therefore, when the method or device in the present invention is applied to the LTE coverage extension environment, the impact of non-linear discharge on an electric quantity of a battery is more obviously reduced, and a battery recovery effect is more obviously enhanced.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The low power consumption communication method and the network device that are provided in the embodiments of the present invention are described in detail above. The principle and implementation of the present invention are described in this specification through specific examples. The description about the embodiments is merely provided to help understand the method and core ideas of the present invention. In addition, a person of ordinary skill in the art can make modifications in terms of the specific implementations and application scopes according to the ideas of the present invention. Therefore, the content of this specification shall not be construed as a limit to the present invention.

What is claimed is:

1. A low power consumption communication method, wherein the method comprises:
    obtaining, by a first network device, a data interval policy, wherein the data interval policy is determined according to a task status of the first network device, so that the first network device can communicate, in the task status, with a second network device according to the data interval policy; and the data interval policy comprises a data segment length and a time interval between data segments, wherein the time interval between data segments is used for recovering an electric quantity of a battery of the second network device;
    sending, by the first network device, the data interval policy to the second network device; and
    sending, by the first network device, data to the second network device according to the data interval policy or receiving data that is sent by the second network device according to the data interval policy.

2. The method according to claim 1, wherein the obtaining, by a first network device, a data interval policy comprises:
    receiving, by the first network device, battery recovery information of the battery of the second network device that is sent by the second network device; and
    determining, by the first network device, the data interval policy according to the task status and the battery recovery information.

3. The method according to claim 2, wherein the determining, by the first network device, the data interval policy according to the task status and the battery recovery information comprises:
    determining, by the first network device, a value range of the data segment length and a value range of the time interval between data segments according to the task status; and
    determining, in the value range of the data segment length and the value range of the time interval between data segments, a value of the data segment length and a value of the time interval between data segments according to the battery recovery information.

4. The method according to claim 3, wherein the battery recovery information comprises information about a current status of the battery of the second network device and type information of the battery.

5. The method according to claim 4, wherein the determining, in the value range of the data segment length and the value range of the time interval between data segments, a value of the data segment length and a value of the time interval between data segments according to the battery recovery information comprises:
  querying a preset corresponding battery type-based recovery effect model according to information about a battery status and information indicating a battery type, to obtain a correspondence that is between a recovery effect and a recovery time and that is of the battery type in the battery status; and
  selecting, according to the correspondence from the value range of the data segment length and the time interval between data segments, a data segment length and a time interval between data segments that are most favorable for battery recovery of the second network device.

6. The method according to claim 1, wherein before the obtaining a data interval policy, the method further comprises:
  determining, by the first network device according to information about the task status, whether to perform low power consumption communication; and
  the obtaining, by a first network device, a data interval policy comprises:
  if determining to perform low power consumption communication, obtaining, by the first network device, the data interval policy.

7. The method according to claim 1, wherein the obtaining, by a first network device, a data interval policy comprises:
  receiving, by the first network device, initial data interval information sent by the second network device, wherein the initial data interval information comprises a value range of the data segment length and a value range of the time interval between data segments that can be used by the second network device to effectively perform battery recovery; and
  determining, by the first network device, the data interval policy in the initial data interval information according to the task status, wherein the data interval policy is favorable for the first network device to process in parallel multiple communication tasks.

8. The method according to claim 1, wherein the obtaining, by a first network device, a data interval policy comprises:
  receiving, by the first network device, a battery recovery indication message sent by the second network device, wherein the battery recovery indication message is used to instruct the first network device to perform low power consumption communication; and
  determining, by the first network device, the data interval policy according to the task status.

9. The method according to claim 8, wherein the determining, by the first network device, the data interval policy according to the task status comprises:
  determining, by the first network device, an allocatable range of the data segment length and an allocatable range of the time interval between data segments according to the task status; and
  determining the data interval policy in the allocatable range of the data segment length and the allocatable range of the time interval between data segments, wherein the data interval policy is favorable for the first network device to process in parallel multiple communication tasks.

10. A low power consumption communication method, wherein the method comprises:
  receiving, by a second network device, a data interval policy sent by a first network device, wherein the data interval policy is determined according to a task status of the first network device, so that the first network device can communicate, in the task status, with the second network device according to the data interval policy; and the data interval policy comprises a data segment length and a time interval between data segments, wherein the time interval between data segments is used for recovering an electric quantity of a battery of the second network device; and
  sending, by the second network device, data to the first network device according to the data interval policy or receiving data that is sent by the first network device according to the data interval policy.

11. The method according to claim 10, wherein before the receiving, by a second network device, a data interval policy sent by a first network device, the method further comprises:
  sending, by the second network device, battery recovery information to the first network device, wherein the battery recovery information is used by the first network device to determine the data interval policy according to the task status and the battery recovery information.

12. The method according to claim 11, wherein the battery recovery information comprises information about a current status of the battery of the second network device and type information of the battery.

13. The method according to claim 10, wherein before the receiving, by a second network device, a data interval policy sent by a first network device, the method further comprises:
  sending, by the second network device, initial data interval information to the first network device, wherein the initial data interval information comprises a value range of the data segment length and a value range of the time interval between data segments that can be used by the second network device to effectively perform battery recovery, and the initial data interval information is used by the first network device to determine the data interval policy according to the initial data interval information and the task status.

14. The method according to claim 10, wherein before the receiving, by a second network device, a data interval policy sent by a first network device, the method further comprises:
  sending, by the second network device, a battery recovery indication message to the first network device, wherein the battery recovery indication message is used to instruct the first network device to perform low power consumption communication.

15. A network device, wherein the network device comprises:
  at least one processor, configured to obtain a data interval policy, wherein the data interval policy is determined according to a task status of the network device, so that the network device can communicate, in the task status, with a second network device according to the data interval policy; and the data interval policy comprises a data segment length and a time interval between data segments, wherein the time interval between data segments is used for recovering an electric quantity of a battery of the second network device; and
  a receiver and a transmitter, configured to: send the data interval policy to the second network device, and send data to the second network device according to the data interval policy or receive data that is sent by the second network device according to the data interval policy.

16. The network device according to claim 15, wherein the receiver is further configured to receive battery recovery information sent by the second network device; and the processor is specifically configured to: when determining the data interval policy, formulate the data interval policy according to the task status and the battery recovery information.

17. The network device according to claim 15, wherein the receiver is further configured to receive a battery recovery indication message sent by the second network device, wherein the battery recovery indication message is used to instruct the network device to perform low power consumption communication; and the processor is specifically configured to: when determining the data interval policy, formulate the data interval policy according to the task status.

18. The network device according to claim 15, wherein the receiver is further configured to receive initial data interval information sent by the second network device, wherein the initial data interval information comprises a value range of the data segment length and a value range of the time interval between data segments that can be used by the second network device to effectively perform battery recovery; and the processor is specifically configured to: when determining the data interval policy, determine the data interval policy in the initial data interval information according to the task status, wherein the data interval policy is favorable for the network device to process in parallel multiple communication tasks.

19. The network device according to claim 15, wherein the processor is further configured to: before determining the data interval policy, determine whether to perform low power consumption communication; and if determining to perform low power consumption communication, obtain the data interval policy.

20. A network device, wherein the network device comprises:

a receiver and a transmitter, configured to: receive a data interval policy sent by a first network device, wherein the data interval policy is determined according to a task status of the first network device, so that the first network device can communicate, in the task status, with the network device according to the data interval policy; and the data interval policy comprises a data segment length and a time interval between data segments, wherein the time interval between data segments is used for recovering an electric quantity of a battery of the network device; and send data to the first network device according to the data interval policy or receive data that is sent by the first network device according to the data interval policy.

21. The network device according to claim 20, wherein the network device further comprises:

a processor, configured to obtain battery recovery information of the network device, wherein the battery recovery information is used by the first network device to determine the data interval policy according to the task status and the battery recovery information; and the transmitter is further configured to send the battery recovery information to the first network device.

22. The network device according to claim 20, wherein the network device further comprises:

a processor, configured to obtain initial data interval information, wherein the initial data interval information comprises a value range of the data segment length and a value range of the time interval between data segments that can be used by the network device to effectively perform battery recovery, and the initial data interval information is used by the first network device to determine the data interval policy according to the initial data interval information and the task status; and the transmitter is further configured to send the initial data interval information to the first network device.

23. The network device according to claim 20, wherein the transmitter is further configured to send a battery recovery indication message to the first network device, wherein the battery recovery indication message is used to instruct the first network device to perform low power consumption communication.

* * * * *